United States Patent Office 2,937,948
Patented May 24, 1960

2,937,948
FOOD PRESERVATIVE AND METHOD OF PREPARING SAME

Vincent J. De Santa Luce, 255 Glendora Ave., Long Beach, Calif.

No Drawing. Filed July 14, 1958, Ser. No. 748,174

2 Claims. (Cl. 99—150)

The present invention relates generally to foodstuffs, and, more particularly, to a new and novel food preservative.

It is a major object of the present invention to provide a food preservative which will preserve food over long periods of time without refrigeration.

Another object of the invention is to provide a food preservative which is readily mixed from easily available ingredients.

A further object is to provide a food preservative which is extremely economical to prepare.

An additional object of the invention is to provide a food preservative which is placed in a container together with the food to be preserved and the container thereafter evacuated of air and sealed.

Yet another object of the invention is to provide a food preservative that is especially adaptable to preserve meats.

Another object is to provide a food preservative utilizing ingredients which are commonly found throughout most countries of the world.

These and other objects and advantages of the present invention will become apparent from the following detailed description of a preferred embodiment thereof.

In the preferred manner of preparing the food preservative embodying the present invention, the following ingredients are necessary:

(1) The root and stalk from the corn plant;
(2) The root and flower of the dandelion plant;
(3) The root and stem of the tomato plant.

These ingredients are ground and then pressed whereby the liquids thereof are extracted. Other suitable means for extracting such liquids, however, may be employed. The liquids are then mixed in the following approximate proportions by volume:

| | Parts |
|---|---|
| (1) Corn | 15 |
| (2) Dandelion | 1 |
| (3) Tomato | 1.5 |

The liquids, after being mixed in the above proportions, are combined and then brought to the boiling point, generally at a temperature of 450 degrees F. Thereafter, the combined liquids are cooled and strained. Preferably, a small amount of benzoate of soda (1/10 of one percent), or its equivalent, is added to the mixed and strained liquids.

In utilizing the food preservative prepared in accordance with the foregoing method, the food to be preserved is placed in a container together with a quantity of the food preservative. Air is then evacuated from the container and the latter is sealed. The food will then be preserved over long periods of time without the necessity of refrigeration. In practice, the aforedescribed food preservative has successfully preserved meats of various types over long periods of time. It will be apparent, however, that foods other than meats may be preserved by this food preservative.

Various modifications and changes may be made with respect to the foregoing description without departing from the spirit of the invention or the scope of the following claims.

I claim:

1. A food preservative, consisting of: the extracted and mixed juices from the root and stalk of the corn plant, the root and flower of the dandelion plant and the root and stem of the tomato plant, said juices being mixed in the approximate proportions of 15 parts corn plant, 1 part dandelion and 1½ parts tomato plant and said juices then being boiled and strained.

2. The process of preparing a food preservative that includes extracting the liquids from the root and stalk of the corn plant, the root and flower of the dandelion plant and the root and stem of the tomato plant, combining said juices in the approximate amount of 15 parts corn plant, one part dandelion plant, 1.5 parts tomato plant, then bringing said combined liquids to the boiling point and thereafter straining said liquids.

References Cited in the file of this patent

UNITED STATES PATENTS

| 820,806 | Manns | May 15, 1906 |
| 1,775,967 | Miles et al. | Sept. 16, 1930 |

FOREIGN PATENTS

| 635,053 | Great Britain | Apr. 5, 1950 |